United States Patent
Nishimura et al.

(10) Patent No.: US 6,436,245 B1
(45) Date of Patent: Aug. 20, 2002

(54) APPARATUS FOR THE PURIFICATION OF ORGANIC COMPOUNDS CONTAINING READILY-BLOCKING SUBSTANCES AND PROCESS THEREOF

(75) Inventors: Takeshi Nishimura, Himeji; Yukihiro Matsumoto, Kobe, both of (JP)

(73) Assignee: Nippon Shokubai Co., Ltd., Osaka-Fu (JP)

( * ) Notice: Subject to any disclaimer, the term of this patent is extended or adjusted under 35 U.S.C. 154(b) by 0 days.

(21) Appl. No.: 09/585,617

(22) Filed: Jun. 2, 2000

(30) Foreign Application Priority Data

Jun. 3, 1999 (JP) .......................... 11-156655

(51) Int. Cl.[7] .............................. B01D 3/20; B01D 3/22; B01D 3/24; C07C 51/44
(52) U.S. Cl. .......................... 203/99; 203/49; 203/100; 203/DIG. 21; 202/158; 261/114.2; 562/600
(58) Field of Search .................. 202/158; 203/8, 203/49, 100, 99, DIG. 21; 261/114.1, 114.4, 114.3, 113, 114.2; 562/600; 549/250; 196/125

(56) References Cited

U.S. PATENT DOCUMENTS

| | | | | |
|---|---|---|---|---|
| 3,603,129 A | * | 9/1971 | Williams et al. | 72/324 |
| 3,717,553 A | * | 2/1973 | Otsuki et al. | 202/158 |
| 4,032,410 A | * | 6/1977 | Kuxdorf et al. | 261/114.5 |
| 4,426,361 A | * | 1/1984 | Bushnell | 202/158 |
| 6,214,174 B1 | * | 4/2001 | Matsumoto et al. | 202/158 |

FOREIGN PATENT DOCUMENTS

| | | |
|---|---|---|
| EP | 0 158 851 | 10/1985 |
| FR | 685734 | 7/1930 |
| FR | 2 556 978 | 6/1985 |
| GB | 763684 | 12/1956 |
| GB | 898212 | 6/1962 |
| WO | 95/31278 | 11/1995 |

OTHER PUBLICATIONS

Fair, J.R., "How to Design Baffle Tray Columns", Hydrocarbon Processing, May 1993, pp. 75–79 and 80.
Lemieux, E.J., "Data for Tower Baffle Design", Hydrocarbon Processing, Sep. 1983, pp. 106–111.

* cited by examiner

Primary Examiner—Virginia Manoharan
(74) Attorney, Agent, or Firm—Wenderoth, Lind & Ponack, L.L.P.

(57) ABSTRACT

A purification tower for purifying liquid by contacting the liquid with gas, the purification tower including:
(a) a shell; and
(b) a plurality of baffles, each of which is fixed to an internal surface of the shell,
  (i) said each baffle having a flat upper surface and a plurality of openings are formed in each of the baffle so that the liquid and the gas pass through the openings;
  (ii) any adjacent pair of the baffles are arranged so that a bottom of the shell is covered by the pair of the baffles viewing in an longitudinal direction of the shell.

The present invention thus configured can provide a process and an apparatus for the purification of even an organic compound containing a readily-blocking substances, which are capable of continuously purifying such an organic substance over the long time without discontinuing operations.

15 Claims, 8 Drawing Sheets

APPARATUS FOR THE PURIFICATION OF ORGANIC COMPOUNDS CONTAINING READILY-BLOCKING SUBSTANCES AND PROCESS THEREOF

BACKGROUND OF THE INVENTION

1. Field of the Invention

The present invention relates to a process and an apparatus for the purification of organic compounds containing readily-blocking substances.

Specifically, the invention relates to a process and an apparatus which is advantageously used for the purification of, for example, (meth)acrylic acid, (meth)acrylic esters, maleic anhydride, phthalic anhydride and other organic compounds containing readily-blocking substances. The readily-blocking substances (hereinafter may be referred to as "cloggy substances") include insoluble solid matters and viscose matters such as slurry and polymer.

2. Description of the Related Art

Figure 1A:
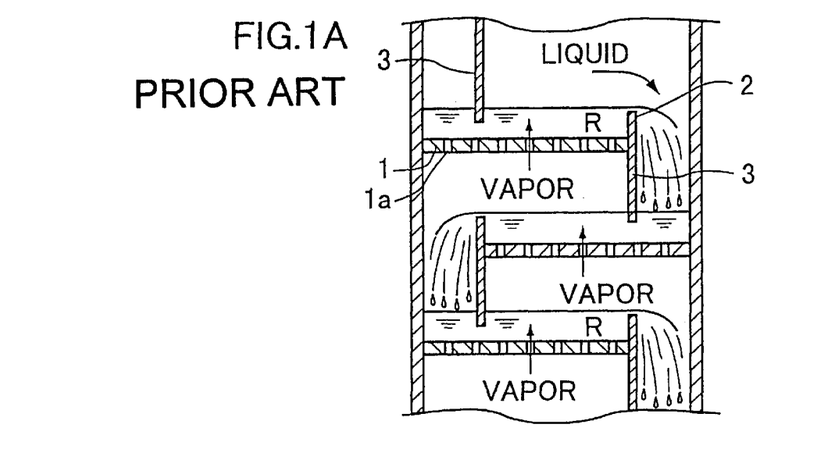
FIGS. 1A to 1C show conventional gas-liquid contact types.
Figure 1B:
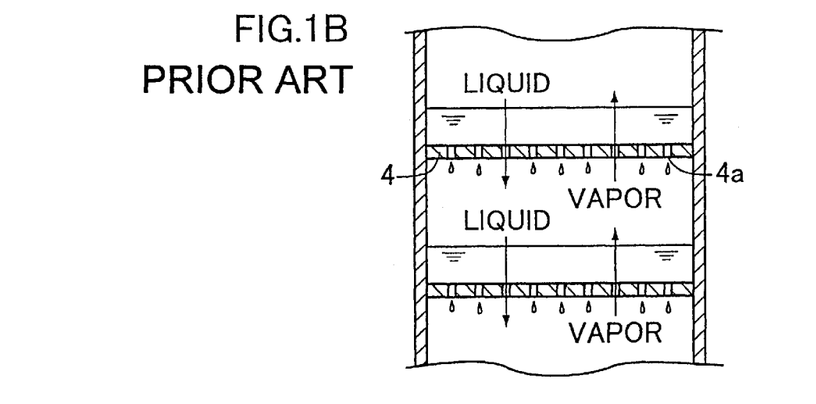
Figure 1C:
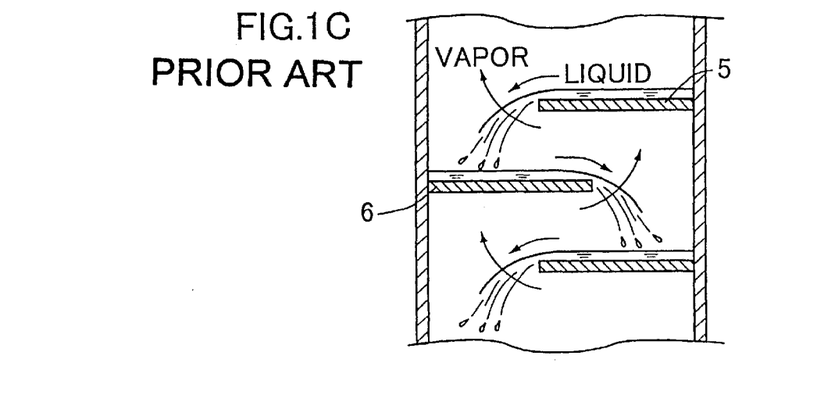

Apparatus for use in the purification of a specific component from a mixture of plural components are classified, with respect to the way of contacting gas component with liquid component (gas-liquid contact) such as cross-current contact type shown in FIG. 1A, counter-current type shown in FIG. 1B, and shower-contact type shown in FIG. 1C.

The purification process of the cross-current contact type shown in FIG. 1A, uses the purification tower having trays 1 with downcomer 3 and weir 2 (dam baffle). The tray 1 has openings 1a through which gas is ascending and the gas is passed through liquid (or slurry) R being held on the tray 1. Thereby gas-liquid contact is performed.

The purification process of the counter-current type shown in FIG. 1B, uses the purification tower having trays 4 with openings 4a. The opening 4a is a orifice in the tray for gas-liquid contact. Gas is ascending through the openings 4a of the tray 4, and the gas is passed through liquid (or slurry) being held on the tray 4. The liquid on the tray 4 is descending thorough the openings 4a and the liquid is also contacting with the gas in the opening 4a and after passing through the opening 4a. Thereby gas-liquid contact is performed.

The purification process of the shower-contact type shown in FIG. 1C, use the purification tower having segmental baffles. Gas-liquid contact is performed when liquid falls from baffle window of an upper baffle 5 to a lower baffle 6 while gas is ascending counter-currently to the liquid.

Comparing gas-liquid contact efficiencies of the purification type FIGS. 1A to 1C, the cross-current contact type (1A) shows the highest efficiency, and the counter-current contact type (1B) shows the second highest efficiency. Accordingly, the cross-current contact type (1A) and the counter-current contact type (1B) are in wide use for purification.

However, when a substance to be purified is an organic compound containing cloggy substances, openings 1a (or openings 4a) of the trays 1 (or trays 4) used in the cross-current contact type and the counter-current contact type are readily blocked by the cloggy substances.

When such clogging occurs, the gas-liquid contact efficiency of the cross-current contact type and counter-current contact type is lowered. Also the clogging, which brought the difficulty in operating the purification tower, inhibits the flow of liquid and gas.

The build-up blockage of the openings must be removed by suspending an operation of the tower and the blockage is removed by manpower or by using chemical agents.

SUMMARY OF THE INVENTION

An object of the invention is to provide an apparatus for the purification of even an organic compound containing readily-blocking substance, which are capable of continuously purifying such an organic substance over the long time without discontinuing an operation.

The above object can be attained by a purification tower comprising:

(a) a shell; and
(b) a plurality of baffles, each of which is fixed to an internal surface of the shell,
  (i) said each baffle having a flat upper surface and a plurality of openings are formed in each of the baffle so that liquid and gas pass through the openings;
  (ii) any adjacent pair of the baffles are arranged so that a bottom of the shell is covered by the pair of the baffles viewing in an longitudinal direction of the shell.

Another object of the invention is to provide a process using the same which can attain the high gas-liquid contact efficiency.

DESCRIPTION OF THE PREFERRED EMBODIMENT

Figure 4A:
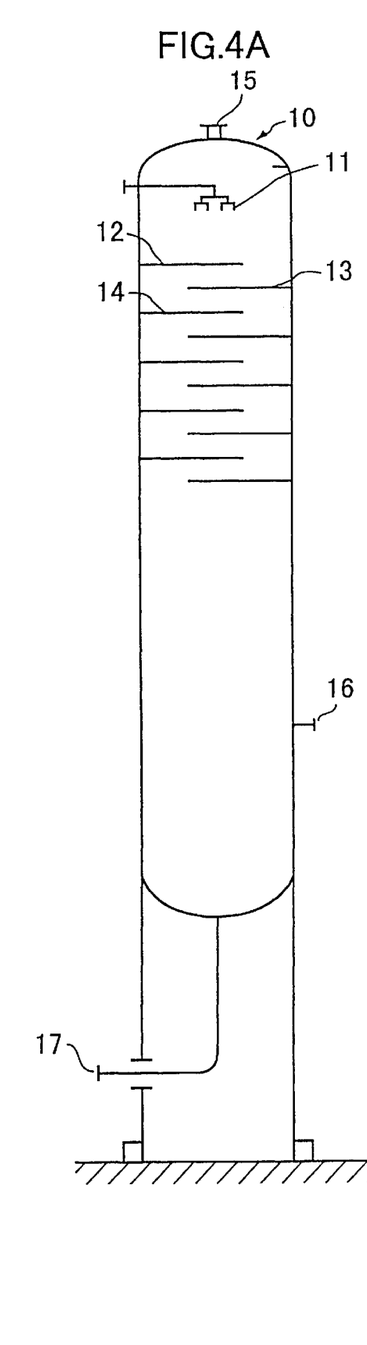
FIGS. 4A and 4B are schematic diagrams illustrating an apparatus for use in the present invention.
Figure 4B:
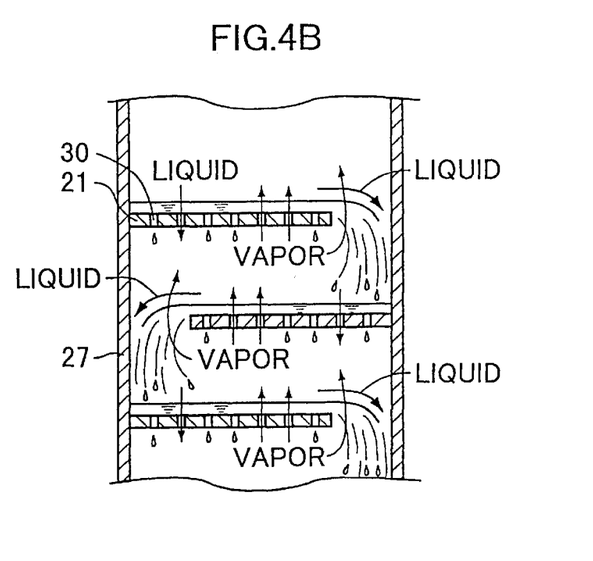

According to the present inventive method, an apparatus for use in the purification of a specific component from a mixture of plural components basically utilizes the shower-contact type such as shown in FIG. 4B. The purification process of the present inventive method will be described by utilizing a purification tower as an apparatus for use in the purification. The purification tower includes, but not limited to, distillation tower, absorption tower, and stripping tower, which are used for the purification.

According to the present invention, a purification tower for purifying liquid by contacting the liquid with gas, the purification tower comprising:

(a) a shell; and
(b) a plurality of baffles, each of which is fixed to an internal surface of the shell,
  (i) said each baffle having a flat upper surface and a plurality of openings are formed in each of the baffle so that the liquid and the gas pass through the openings;
  (ii) any adjacent pair of the baffles are arranged so that a bottom of the shell is covered by the pair of the baffles viewing in an longitudinal direction of the shell.

According to the present invention, the liquid to be purified in the purification tower includes, but not limited to, condensate liquid of reaction gas and solvent entrapment liquid which may be obtained from oxidation of raw material in the purification process of the specific component.

Also the liquid may be organic compounds containing cloggy substances.

The organic compound may be at least one selected from the group of (meth)acrylic acid, (meth)acrylic ester, phthalic anhydride and maleic anhydride, but not limited to these examples. The specific component may be the organic compound such as mentioned above.

The cloggy substances contained in (meth)acrylic acid include, for example, precipitate such as polymer, terephthalic acid and fumaric acid. The cloggy substances contained in phthalic anhydride and maleic anhydride include, for example, tar such as condensation product of quinone, polymerized product of aldehyde.

The gas which is introduced to the purification tower includes, but not limited to, vapor which may be generated from reboiler and reacted gas which may be obtained from the oxidation mentioned above.

The present invention will be described in detail with reference to several Figures but it should be noted that the Figures are just an example usable in the present invention, the present invention does not necessarily use these examples.

FIG. 4A is a schematic diagram illustrating a purification tower for use in the present invention. The purification tower 10 is preferably shell which may be hollow cylindrical shape. A plurality of baffles are fixed to an internal surface 27 of the shell such as shown in FIG. 4B.

Figure 2:
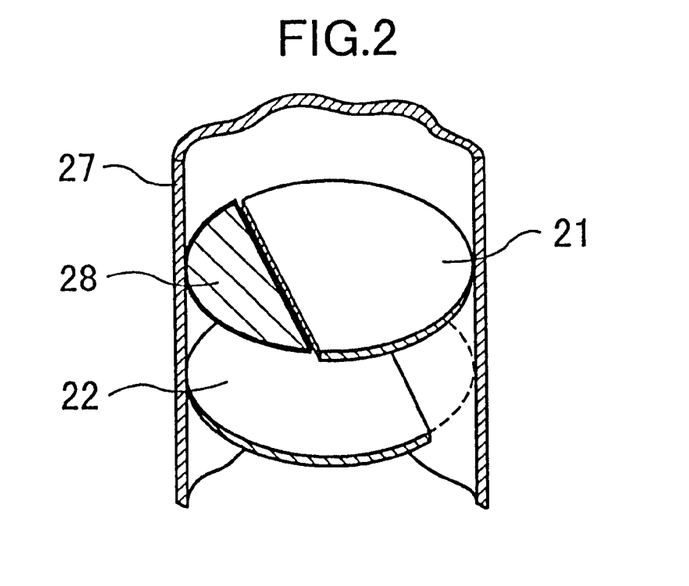
FIG. 2 is a diagram-illustrating the window area 28.

As shown in FIG. 2, the baffle 21 for use preferably in the present invention has cutout portion 28 (hereinafter may be referred to as "window area") through which gas and liquid pass. The baffle also preferably has a flat upper surface and a plurality of openings 30 so that liquid and gas also pass through the openings 30.

Through a liquid supplier (distributor) 11, which is mounted on upper portion of inside the tower 10, the liquid containing organic compound and cloggy substances is supplied to an upper baffle 12 of the tower 10, and the liquid downwardly flows to a baffle 13 passing through the window area and through the openings 30 of the baffle, and to other lower baffles while coming in contact with the gas. The gas is supplied to the tower below the bottom baffle through a gas inlet nozzle 16 installed at a lower-portion of the tower 10. The liquid is purified by the gas-liquid contact and the purified liquid is stored at the bottom of the tower 10 and is discharged through the liquid outlet nozzle 17 equipped at the bottom of the tower 10. The gas supplied to the tower 10 is discharged from the gas outlet nozzle 15 which is preferably installed at upper portion of the tower 10.

As mentioned above, in the conventional purification process of the shower-contact type shown in FIG. 1C, gas-liquid contact is performed only when liquid downflows from an upper baffle 5 to a lower baffle 6 while gas is ascending counter-currently to the liquid, and which result in lower gas-liquid contact efficiency.

The baffles used in the conventional shower-contact type purification tower (FIG. 1C) have no openings on its overall surface. In the conventional shower-contact type (FIG. 1C), gas-liquid contact is carried out only when gas and liquid pass through the window area and the curtain area of the baffle.

Figure 5:
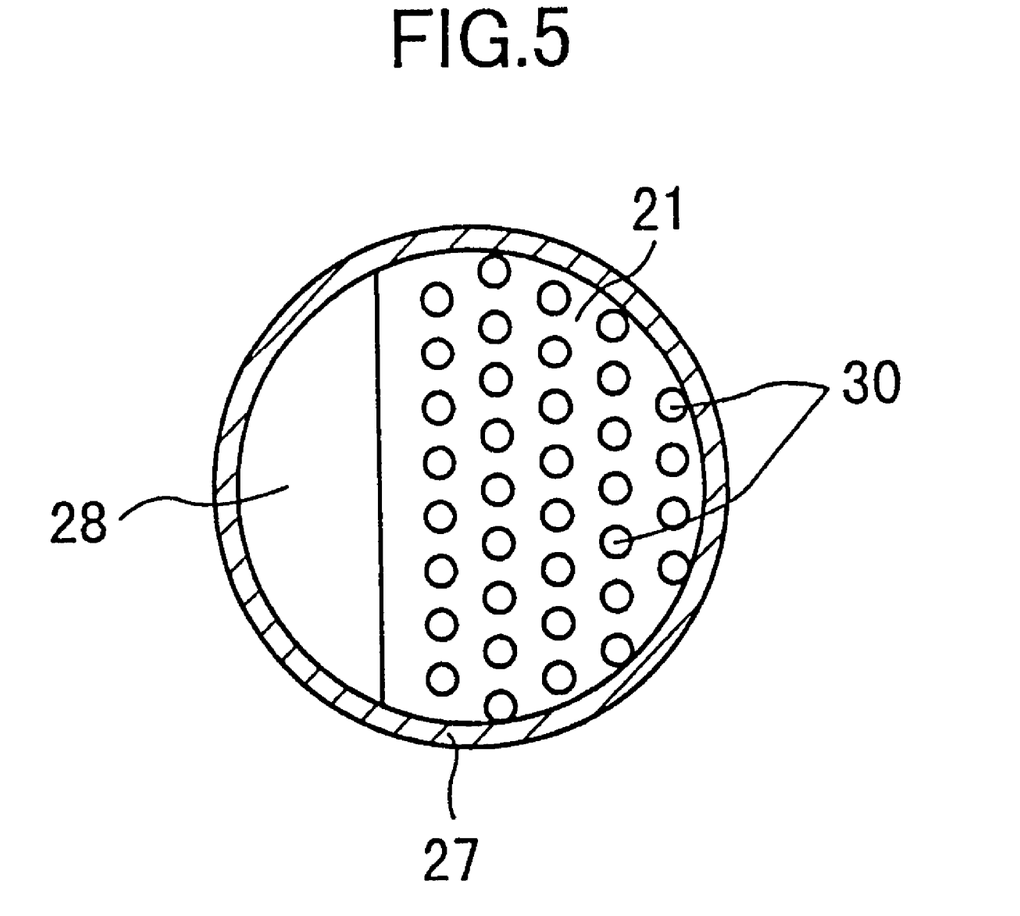
FIG. 5 is an illustration of a typical segmental baffle for advantageous use in the present invention.

The present inventors found that gas-liquid contact efficiency can be markedly increased by forming and distributing openings (penetrates) 30 on an overall surface of the baffle such as shown in FIG. 5. The gas-liquid contact efficiency is dramatically increased by contacting gas which is ascending through the openings 30 with liquid on the tray 15 and/or with liquid descending through the openings 30.

According to the present inventive method, in addition to the counter-current gas-liquid contact through the window area 28, gas-liquid contact is performed through the openings 30 of the baffle. A part of gas is ascending through the openings 30 and a part of liquid on the baffle is descending thorough the openings 30 thereby more efficient gas-liquid contact can be attained, which yields more efficient purification performance of the liquid.

The shower-contact type purification tower 10 utilized in the present invention ensures gas and liquid flow through the window area 28 of the baffle, even if the openings 30 of the baffle partially clogged by the cloggy substances.

The opening 30 connects the surface of the baffle with the other side of the baffle so that the gas and the liquid can pass through the opening 30.

A hole size of the opening 30 is not specifically limited but if the opening 30 have an extremely small hole size, the opening 30 are liable to block or jam. The hole size of the-opening 30 preferably is 3 mm or more, and more preferably 12 mm or more in diameter. In contrast, if the opening 30 have an extremely large hole size, the gas-liquid contact efficiency may be decreased due to the weeping. The hole size of the opening 30 is preferably 30 mm or less, and more preferably 25 mm or less in diameter.

The arrangement of each opening 30 on the surface of each baffle is not specifically limited, but the preferable arrangement of the openings 30 on the surface may be that the openings 30 having the same hole size are uniformly formed on all over the surface of the baffle such as shown in FIG. 5.

Also the shape of each opening 30 on the surface of the baffle (plan view shape), can be oval, elliptical, polygon or any other shape, but to prevent the opening 30 from blocking or jam, the most preferable opening shape for use in the present invention is circular shape such as shown in FIG.5.

Noted that if the plan view shape of the opening 30 is other than circle, the hole size of the opening 30 can be decided by measuring equivalent circle diameter.

To exhibit satisfactory advantages of the function of the opening 30, the total area of the openings 30 formed on the baffle preferably occupies 10% or more, more preferably 20% or more and preferably 50% or less, more preferably 40% or less of upper surface area of the baffle.

The total number of the openings 30 formed in the baffle is not specifically limited, but it is preferable to adjust the total number of the openings 30 to satisfy the diameter and the total openings area mentioned above. If the total openings area is within above mentioned range, preferable gas-liquid contact efficiency may be attained with suppressing the formation of the blocking in the opening 30. Noted that all the baffles fixed to the tower 10 may have identical opening shape, number, size and total area with each other, or may have different opening shape, number, size and total area from each other. Combination of these configuration is not specifically limited unless the purpose of the present invention is attained.

Figure 8A:
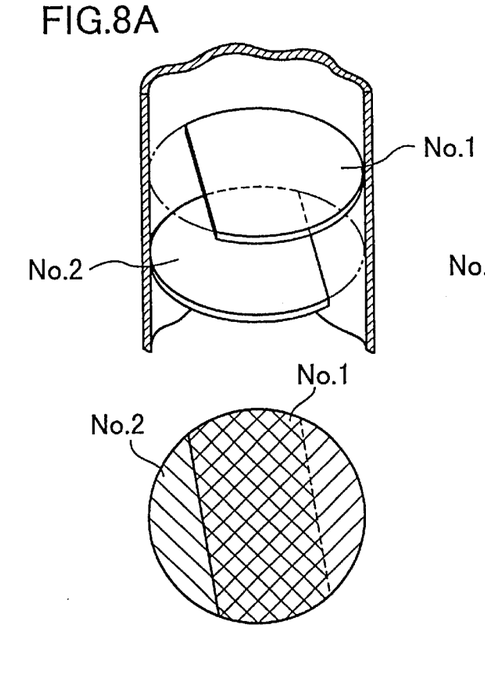
FIGS. 8A to 8C are illustrations of arrangement of baffles for use in the present invention.
Figure 8B:
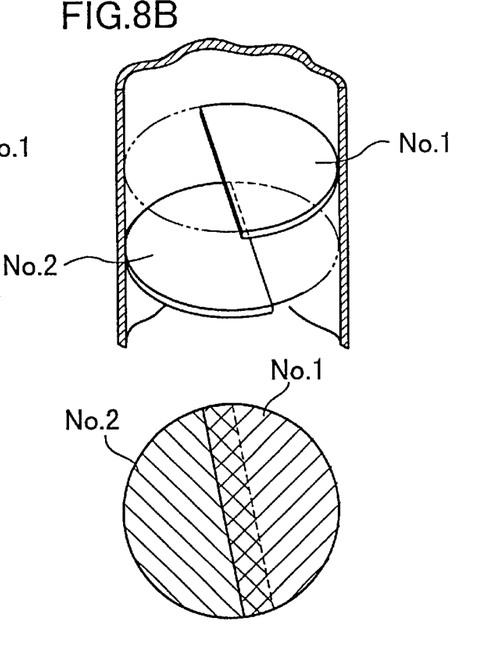
Figure 8C:
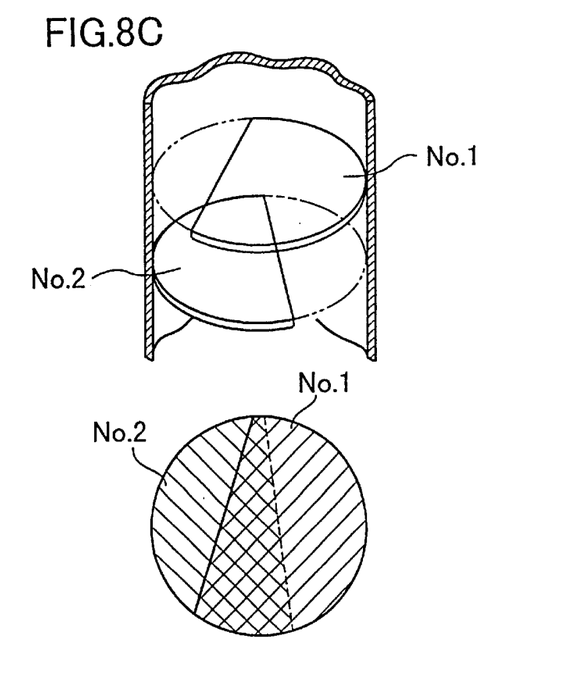

According to the present invention, any adjacent pair of the segmental baffles fixed to the inside the tower preferably be arranged so that a bottom of the tower is covered by the pair of the baffles viewing in an longitudinal direction of the tower such as shown in FIGS. 8A to 8C.

Figure 9:
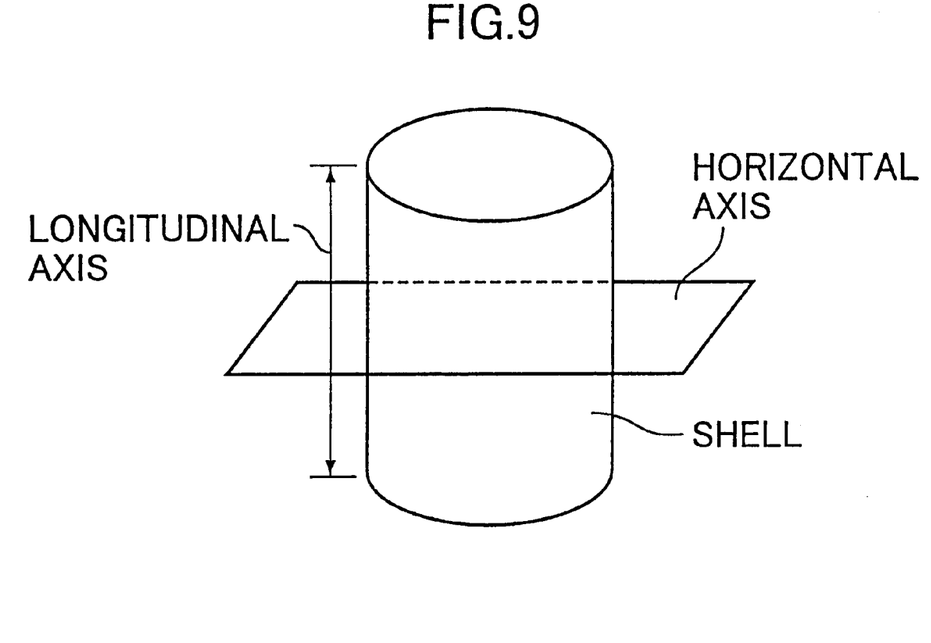
FIG. 9 shows a horizontal axis and longitudinal axis of a shell used in the present invention.

The window area 28, which is a baffle free area, shown in FIG. 5 preferably occupies 10% or more and more preferably 20% or more of a horizontal cross-sectional area inside the tower 10, which is orthogonal to the longitudinal axis of the tower 10 such as shown in FIG. 9. If the window area 28 occupies less than 10% of the horizontal cross-sectional area, flooding may be easily occurred.

The flooding is defined as the point at which an excessive amount of liquid was entrained at the top of the tower.

Also the window area 28 of the baffle preferably occupies 70% or less, more preferably 45% or less of the horizontal cross-sectional area inside the tower 10. If the window area of the baffle occupies more than 70% of the horizontal cross-sectional area, liquid may flow to the bottom of the tower without having enough contact with gas (short-pass) thereby sufficient gas-liquid contact efficiency may not be attained.

All the baffles fixed in the tower 10 may have the identical window area ratio and in this case, the area of each window area occupies preferably 50% or less of the horizontal cross-sectional area.

Alternatively, baffles having different window area may be used in combination such as shown in FIGS. 6A to 6D and in this case, for example, a baffle which has 70% window area and one which has 10% window area with respect to the horizontal cross-sectional area can be used in combination.

Figure 3:
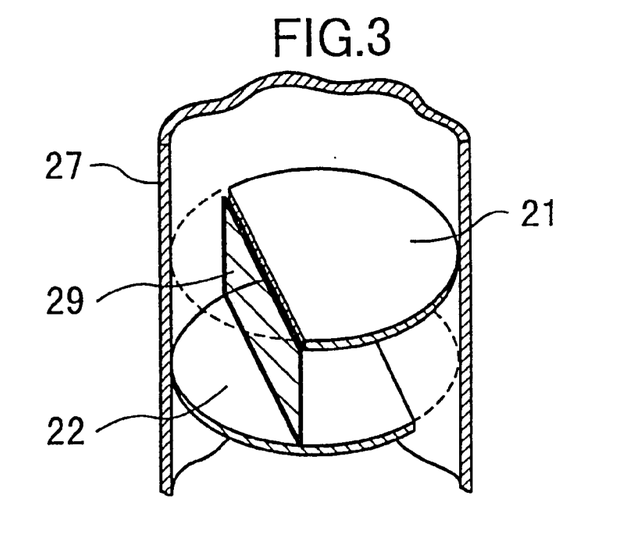
FIG. 3 is a diagram illustrating the curtain area 29.

The area 29 (hereinafter may be called "curtain area") in FIG. 3 which is the overflow area formed between upper baffle 21 and lower baffle 22 adjacent to each other preferably occupies 10% or more, more preferably 20% or more, and preferably 120% or less, more preferably 110% or less of a horizontal cross-sectional area inside the tower, which is orthogonal to a longitudinal axis of the tower 10 as shown in FIG. 9.

If the curtain area 29 is less than 10% of the horizontal cross-sectional area, the flooding may be easily occurred. Contrary to this, if the curtain opening region 29 occupies more than 120% of the horizontal cross-sectional area, the gas-liquid contact efficiency may be saturated.

Figure 6A:
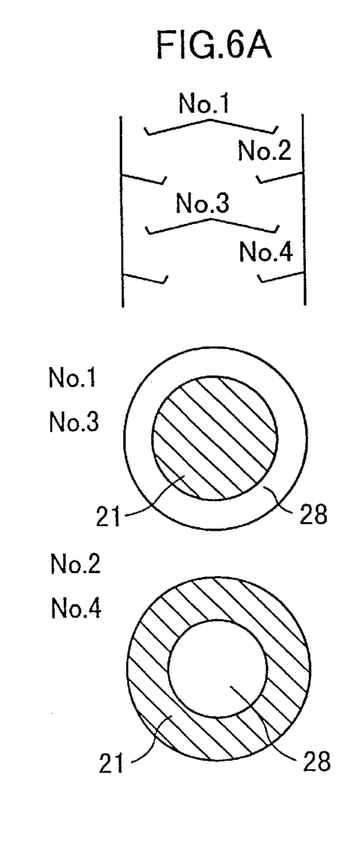
FIGS. 6A to 6D are illustrations of types of baffles for use in the present invention.
Figure 6B:
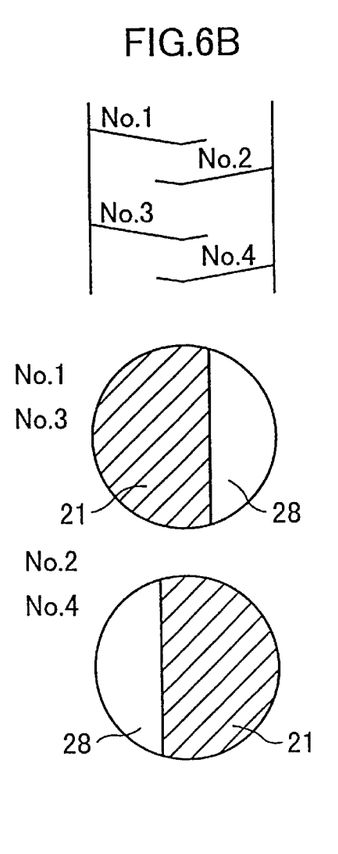
Figure 6C:
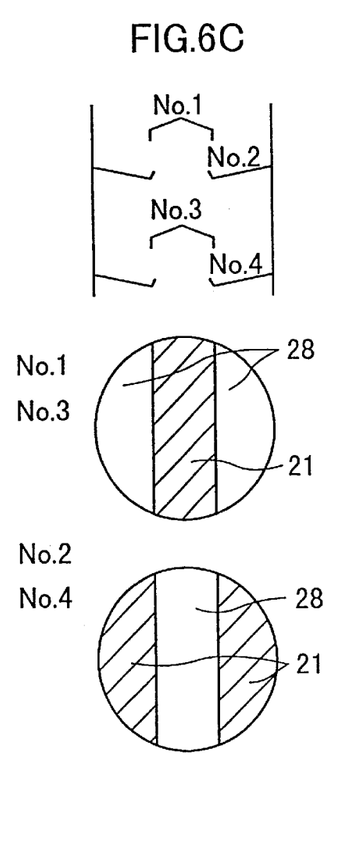
Figure 6D:
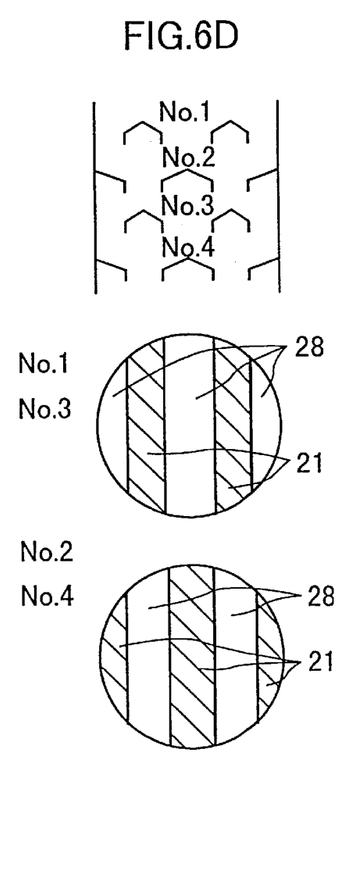

The shape of the. baffle for use in the invention include, but are not limited to, disk-doughnut baffles such as shown in FIG. 6A and segmental baffles such as shown in FIGS. 6B to 6D. As the segmental baffle, double pass type segmental baffles shown in FIG. 6C and multi-pass type segmental baffles shown in FIG. 6D can be employed.

The baffles can be fixed to the internal surface of the tower 10 at any desired angle with respect to an longitudinal axis of the tower 10.

Figure 7A:
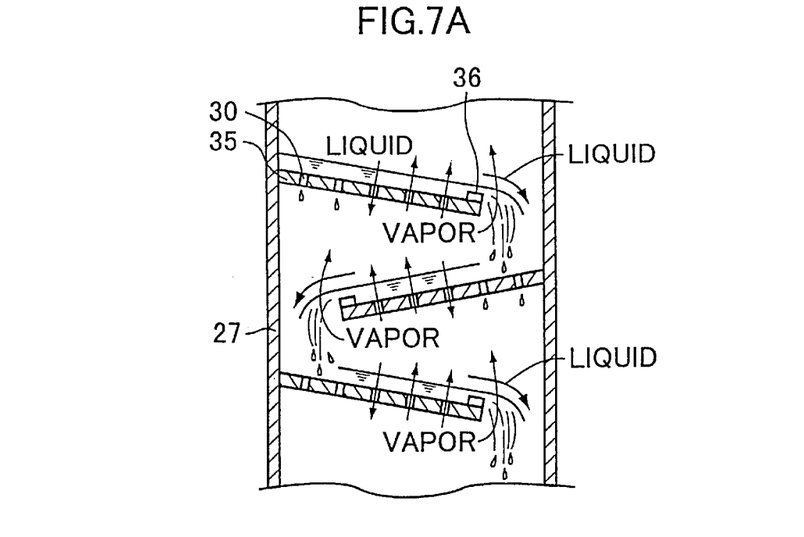
FIGS. 7A to 7C are schematic diagrams illustrating an apparatus for use in the present invention.
Figure 7B:
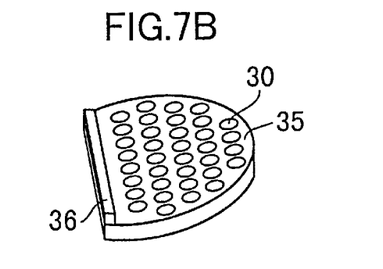

The baffle can be fixed to an internal surface of the tower 10 and inclining to a horizontal cross-sectional area of the tower 10, which is orthogonal to a longitudinal axis of the tower 10. It should be noted that if the angle is too wide, liquid may flow to the bottom of the tower without having enough contact with gas thereby sufficient gas-liquid contact may not be attained. If the baffle is sloped, it is preferable to fix the baffle to the inner wall of the tower 10 at an angle 10° or less with respect to the horizontal cross-sectional area of the tower 10 such as shown in FIG. 7A. It is also preferable to form a weir 36 at the edge of the baffle such as shown in FIG. 7B when the baffle is sloped. The weir 36 preferably functions for holding the liquid.

Figure 7C:
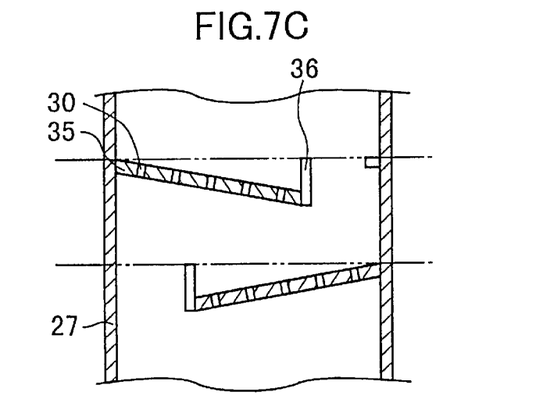

A preferable height of the weir is not specifically limited, but it is recommended that the top of the weir 36 is preferably not over the horizontal line which is extended from the fixed portion of the baffle with the inner wall of the tower 10 such as shown in FIG. 7C. Said horizontal line is an orthogonal to the longitudinal axis of the tower 10. The height of the weir 36 may be 5% or more, more preferably 10% or more, most preferably 15% or more, and preferably 40% or less, more preferably 35% or less, most preferably 30% or less of the baffle space. The baffle space is distance between a baffle to which the weir 36 is attached and an upper baffle which is adjacent to said weir 36 attached baffle.

The preferable height of the weir 36 is relatively low to avoid liquid from being held on the baffle such as shown in FIG. 1A. If liquid is held on the baffle due to the height of the weir, especially when large amount of the liquid is held on the baffle, cloggy substances may clog the openings 30 of the baffle.

To avoid such clogging, it is recommended that each baffle may be preferably fixed to the internal surface of the tower at an angle 90° with respect to an longitudinal axis of the tower 10 such as shown in FIG. 4B. Also it may be recommended that each baffle may be preferably fixed to the internal surface of the tower at an angle 90° with respect to the longitudinal axis of the tower 10 without forming the weir 36.

The temperature in the tower during operation should preferably be kept above melting point of the specified substance (i.e. (meth)acrylic acid, (meth)acrylic ester, phthalic anhydride and maleic anhydride) so that the gas-liquid contact operation can be performed. Take acrylic acid as an example, the temperature in the tower is preferably 20° C. or more, more preferably 40° C. or more and preferably 150° C. or less, more preferably 100° C. or less.

The present invention thus configured can provide a process and apparatus for the purification of even an organic compound containing a cloggy substance, which are capable of continuously purifying such an organic substance over the long time without discontinuing operations.

The present invention will now be illustrated in more detail with reference to several inventive examples and a comparative example below, which are not intended to limit the scope of the invention.

EXAMPLE 1

A methacrylic acid aqueous solution containing cloggy substances such as terephthalic acid slurry and having the following composition was fed to the top of the tower 10 through the distributor 11 at a rate of 12 m$^3$/h. Air was fed to a the bottom of the tower 10 through the gas inlet nozzle 16 at a rate of 2 Nm$^3$/h via reboiler (not shown). The purification of methacrylic acid was performed under the condition of the tower that at a top pressure of 26700 Pa, at temperature of 68° C., at a ratio of distillate rate to feed rate of 4%. As a result, a bottom product which was obtained through the liquid outlet nozzle 17 had the following composition, and the operation could be continuously performed for one year. As a purification tower 10, a tower A shown in Table 1 was employed.

Feed composition:

methacrylic acid: 35% methacrolein: 4000 ppm slurry concentration: 0.2%

Baffle specifications:

hole size: 25 mm ratio of total opening area to tray area 30%

Bottom product composition:

methacrylic acid: 37% methacrolein: 200 ppm

TABLE 1

|  | Tower A | Tower B | Tower C |
|---|---|---|---|
| Column Diameter (mm) | 750 | 4500 | 155 |
| Baffle spacing (mm) | 400 | 500 | 150 |
| Area Ratio of hole (%) | 31.0 | 30.6 | 31.9 |
| Hole Size (mm) | 25 | 25 | 12 |
| Area Ratio of Window (%) | 21.4 | 21.4 | 21.5 |
| Area Ratio of Curtain (%) | 60.1 | 12.5 | 106.6 |

EXAMPLES 2

Gas containing methacrylic acid and cloggy substances was cooled down. The gas was introduced to a purification tower B indicated in Table 1. The gas was fed to the tower 10 from its bottom at a rate of 1020 Nm$^3$/h through the gas inlet nozzle 16, methacrylic acid aqueous solution (19 wt % of methacrylic acid in the solution) was fed to the tower from its top at a rate of 19 m$^3$/h and with the bottoms, which is a liquid obtained from the bottom of the tower, was fed to the tower from its top at a rate of 500 m$^3$/h through the distributor 11.

The gas was purified at a top pressure of 124000 KPa, at temperature of 71° C. As a result, a bottom product which was to be used in Example 1 as a feed (methacrylic acid aqueous solution) was obtained through the liquid outlet nozzle 17, and the operation could be continuously performed for one year.

Feed gas composition:
  methacrylic acid: 2 vol %
  methacrolein: 0.6 vol %
  water: 12 vol %
  other: 85.4 vol %

EXAMPLE 3

Purification was performed in the same manner as in Example 1, except that a tower C indicated in Table 1 was used and that the amount of treated feed was changed to 0.5 m$^3$/h. As a result, the purification operation could be also continued for one year.

COMPARATIVE EXAMPLE 1

Purification was performed in the same manner as in Example 1, except that baffles having no opening were used. As a result, the purification operation could be continued for one year, but the separation performance in this example was lower than that in Example 1.

Bottom product composition:
  methacrylic acid: 37%
  methacrolein: 700 ppm

COMPARATIVE EXAMPLE 2

Purification was performed in the same manner as in Example 1, except that a counter-current type tower shown in 1B was employed. (The openings was uniformly formed in each of the tray and the hole size of each opening is 10 mm.) About one week into operation, the bottom pressure of the tower was elevated to 30700 Pa and the purification operation was forced to discontinue as openings of the trays were blocked.

The entire disclosure of Japanese Patent Application No. 11-156655 including specification, claims, drawings and summary are incorporated herein by reference in its entirety.

Other embodiments and variations will be obvious to those skilled in the art, and this invention is not to be limited to the specific matters stated above.

What is claimed is:

1. A purification tower for purifying liquid by contacting the liquid with gas, the purification tower comprising:
   a shell having an internal surface;
   a liquid supply component for supplying a liquid into an upper end of said shell, the liquid comprising an organic substance and clogging substances, the organic substance including at least one compound selected from a group consisting of (meth)acrylic acid, (meth) acrylic ester, phthalic anhydride and maleic anhydride; and
   a plurality of baffles fixed to said internal surface of said shell, each of said baffles having a flat upper surface and a plurality of openings arranged so that the liquid and the gas pass through said openings, an adjacent pair of said baffles being arranged so that a bottom of said shell is covered by said adjacent pair of said baffles when viewed in a longitudinal direction of said shell, a total area of said openings of each of said baffles comprising 10% to 50% of an area of said upper surface of each of said baffles.

2. The purification tower according to claim 1, wherein said baffles are fixed to said internal surface of said shell at an angle of 90° with respect to a longitudinal axis of said shell.

3. The purification tower according to claim 1, wherein a diameter of each of said openings is from 3 mm to 30 mm.

4. The purification tower according to claim 1, wherein a window area adjacent to each of said baffles occupies from 10% to 70% of a horizontal cross-sectional area inside said shell.

5. The purification tower according to claim 1, wherein a curtain area between each of said baffles occupies from 10% to 120% of a horizontal cross-sectional area inside said shell.

6. The purification tower according to claim 1, wherein each of said baffles is fixed to an internal surface of said shell and inclined with respect to a horizontal cross-sectional area of said shell, a horizontal cross-section being orthogonal to a longitudinal axis of said shell.

7. The purification tower according to claim 6, wherein each of said baffles has a weir at a distal edge thereof.

8. The purification tower according to claim 6, wherein a diameter of each of said openings is from 3 mm to 30 mm.

9. The purification tower according to claim 6, wherein a window area adjacent to each of said baffles occupies from 10% to 70% of a horizontal cross-sectional area inside said shell.

10. The purification tower according to claim 6, wherein a curtain area between each of said baffles occupies from 10% to 120% of a horizontal cross-sectional area inside said shell.

11. The purification tower according to claim 6, wherein a height of said weir is from 5% to 40% of a distance between adjacent baffles.

12. The purification tower according to claim 6, wherein each of said baffles is downwardly inclined.

13. The purification tower according to claim 12, wherein each of said baffles has a weir at a distal edge thereof.

14. A purification tower for purifying liquid by contacting the liquid with gas, the purification tower comprising:
   a shell having an internal surface;
   a liquid supply component for supplying a liquid into an upper end of said shell, the liquid comprising an organic substance and clogging substances, the organic substance including at least one compound selected from a group consisting of (meth)acrylic acid, (meth)acrylic ester, phthalic anhydride and maleic anhydride; and a plurality of baffles fixed to said internal surface of said shell, each of said baffles having a flat upper surface and a plurality of openings arranged so that the liquid and the gas pass through said openings, an adjacent pair of said baffles being arranged so that a bottom of said shell is covered by said adjacent pair of said baffles when viewed in a longitudinal direction of said shell, said baffles being arranged in said shell such that a curtain area between each of said baffles occupies from 10% to 120% of a horizontal cross-sectional area inside said shell.

15. A process for the purification of liquid by contacting the liquid with gas utilizing a purification tower, comprising:

supplying the liquid into an upper end of the purification tower, wherein the liquid contains an organic substance and clogging substances, the organic substance including at least one compound selected from a group consisting of (meth)acrylic acid, (meth)acrylic ester, phthalic anhydride and maleic anhydride; and supplying the gas into a lower end of the purification tower such that the gas and liquid come into contact with each other, wherein the purification tower includes:

a shell having an internal surface; and a plurality of baffles fixed to the internal surface of the shell, each of the baffles having a flat upper surface and a plurality of openings arranged so that the liquid and the gas pass through the openings an adjacent pair of the baffles being arranged so that a bottom of the shell is covered by the adjacent pair of the baffles when viewed in a longitudinal direction of the shell, a total area of the openings of each of the baffles comprising 10% to 50% of an area of said upper surface of each of the baffles.

* * * * *